United States Patent [19]
Kim et al.

[11] Patent Number: 5,530,564
[45] Date of Patent: Jun. 25, 1996

[54] HOLOGRAPHIC INTERFERENCE EXPOSING DEVICE

[75] Inventors: Tae J. Kim, Seongnam-Si; Doo H. Lee, Songpagu, both of Rep. of Korea

[73] Assignee: Hyundai Electronics Industries Co., Ltd., Kyoungkido, Rep. of Korea

[21] Appl. No.: 114,438

[22] Filed: Aug. 30, 1993

[30] Foreign Application Priority Data

Sep. 1, 1992 [KR] Rep. of Korea .................. 1992-15862

[51] Int. Cl.$^6$ .............................. G03H 1/04; G01B 9/02; G01B 11/00
[52] U.S. Cl. .............................. 359/3; 356/347; 356/349; 356/363; 359/27; 359/30
[58] Field of Search .................. 359/7, 10, 27, 359/30, 35, 330, 331, 3; 356/349, 347, 348, 363

[56] References Cited

U.S. PATENT DOCUMENTS 4,528,464 7/1985 Chemla et al. .................. 372/50
5,305,123 4/1994 Sadovnik et al. .................. 356/349

*Primary Examiner*—Martin Lerner
*Attorney, Agent, or Firm*—Darby & Darby

[57] ABSTRACT

A holographic interference exposing device using a visible laser source and a chopper to easily align the optical system while confirming the light path of the laser beam with the naked eye. The exposing device comprises a main laser source generating a short wavelength laser beam, a beam splitter for splitting the laser beam into two laser beams to cause a difference in the light path of the laser beam and to form an interference fringe on a semiconductor substrate, mirrors for guiding the laser beam to the beam splitter, and mirrors for focusing the two laser beams on a surface of the semiconductor substrate, an auxiliary laser source generating a long wavelength laser beam, and a chopper making the light path of the long wavelength laser beam get together with that of the short wavelength laser beam. The auxiliary laser source generates a visible laser beam having a wavelength longer than that of an ultraviolet laser beam.

4 Claims, 3 Drawing Sheets

HOLOGRAPHIC INTERFERENCE EXPOSING DEVICE

BACKGROUND OF THE INVENTION

1. Field of the Invention

The present invention relates in general to a holographic interference exposing device, and more particularly to a holographic interference exposing device suitable for used in preparation of a diffraction grating of a fixed period of several thousand Angstroms used for varieties of optical systems, such as spectrometers, interference systems, semiconductor lasers and optical communication systems.

2. Description of the Prior Art

Conventionally, a holographic interference exposing device has been used for patterning a semiconductor device by forming an interference fringe using a difference of light paths of laser beams.

With reference to FIG. 1, there is shown a holographic interference exposing device (hereinafter, referred to simply as "the known exposing device") in accordance with an embodiment of the prior art. In this drawing, the reference numeral 1 denotes a laser source, each of the numerals 2, 3, 5 and 6 denotes a mirror, the numerals 4 denotes a half mirror or a beam splitter and the numeral 7 denotes a semiconductor substrate.

As shown in this drawing, the beam splitter 4 of the known exposing device splits the laser beam of a short wavelength generated by the laser source 1 into two laser beams which are to pass along different light paths, respectively. Thereafter, the known exposing device generates a light and shade fringe having a predetermined period using the difference of the light paths of the two laser beams.

In the process for preparation of the desired semiconductor device using the fringe, the grating of a micro period of about 2,000Å is generated. Here, the exposing laser source 1 generates ultraviolet laser beam which has a short wavelength as well as a sufficient amount of energy for developing the photoresists on the semiconductor substrate 7.

The laser beam generated by the laser source 1 is orderly reflected by the mirrors 2 and 3 prior to reaching the beam splitter 4 where the laser beam is split into two laser beams. The two laser beams split by the beam splitter 4 are in turn reflected by individual mirrors 5 and 6 to be focused on the surface of the semiconductor substrate 7. When the two laser beams are focused on the surface of the substrate 7, the interference fringe is formed on the surface of the substrate 7.

This fringe is used in developing the photoresists on the semiconductor substrate 7 to form a supermicro pattern on the semiconductor substrate 7. That is, the photoresists 8 having the grating of a given period 12 are developed on the substrate 7 as shown in FIG. 2.

Turning to FIG. 3, there is shown in a sectional view the substrate 7 which has been subjected to an etching treatment using the photoresists 8 developed on the substrate 7.

However, the aforementioned exposing device has several problems. That is, an invisible laser source, such as an ultraviolet laser source or an infrared laser source, has been used as a laser source of varieties of interference systems, including a holographic interference exposing system, and of spectrometers used in preparation of a supermicro diffraction grating. Here, the problem is caused by the fact that the laser beam is invisible and this makes the alignment of the optical system quite difficult. In order to overcome such a problem caused by the invisible laser beam, a visible laser source, such as a He-Ne gas laser source generating a red laser beam or a semiconductor laser source, may be installed in the housing of the main laser source such that it positioned at the same place as the main laser source. In addition, the visible laser source may be positioned at a place spaced apart from the main laser source while making the light path of the visible laser beam generated thereafter combine or superimpose with that of the invisible laser beam generated by the main laser source. However, to place the invisible laser source and the visible laser source at the same position requires a special technique and this causes the laser source to be very expensive. On the other hand, to place the visible laser source at a position spaced apart from the invisible laser source causes a problem in manufacture of the optical system due to the vibration difference between the positions of the respective laser sources.

SUMMARY OF THE INVENTION

It is, therefore, an object of the present invention to provide a holographic interference exposing device in which the above problems can be overcome and which additionally uses a visible laser source and a chopper to easily align the optical system while confirming the light path of the laser beam with the naked eye.

To accomplish the above object, the present invention provides a holographic interference exposing device comprising a main laser source generating a short wavelength laser beam, a beam splitter for splitting the laser beam into two laser beams to cause a difference in the light path of the laser beam and to form an interference fringe on a semiconductor substrate, means for guiding the laser beam to the beam splitter, and means for redirecting the two laser beams on a surface of the semiconductor substrate, wherein the improvement comprises: an auxiliary laser source generating a long wavelength laser beam; and a chopper making the light path of the long wavelength laser beam combine with that of the short wavelength laser beam.

BRIEF DESCRIPTION OF THE DRAWINGS

The above and other objects, features and other advantages of the present invention will be more clearly understood from the following detailed description taken in conjunction with the accompanying drawings in which.

DESCRIPTION OF THE PREFERRED EMBODIMENTS

Figure 1:
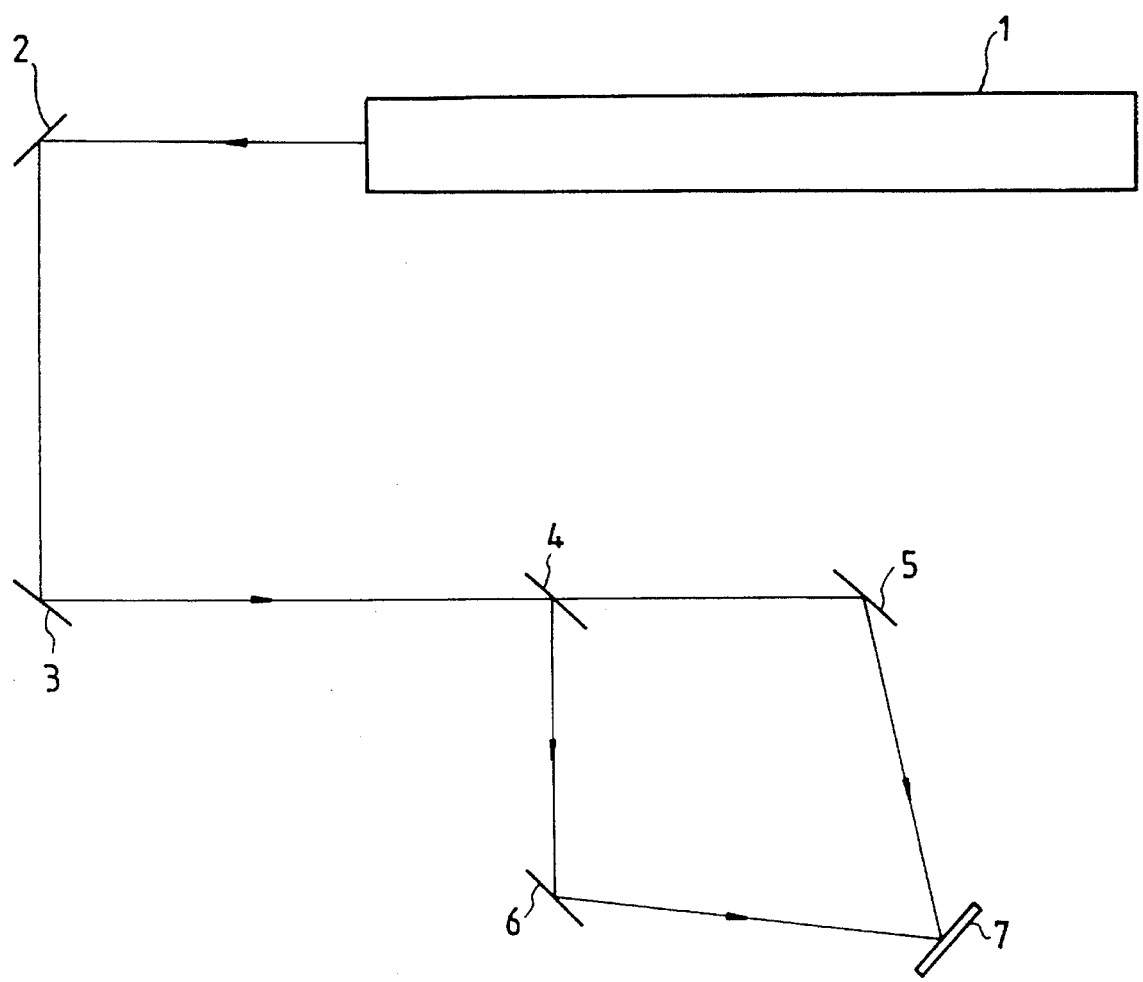
FIG. 1 is a schematic view showing a construction of a holographic interference exposing device in accordance with an embodiment of the prior art.
Figure 2:
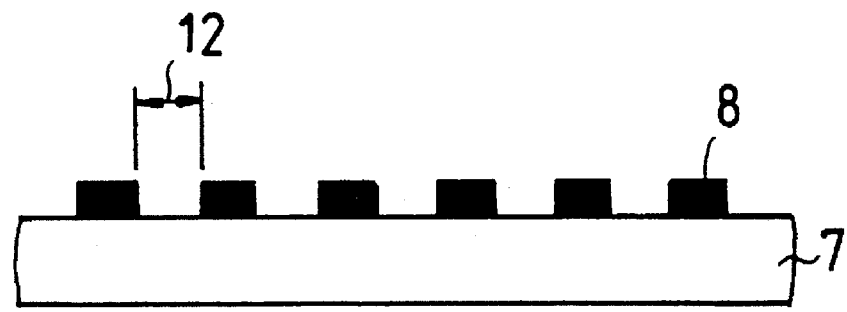
FIG. 2 is a sectional view of a wafer on the surface of which a plurality of photoresists are developed with a grating of a fixed period by the holographic interference exposing device of FIG. 1.
Figure 3:
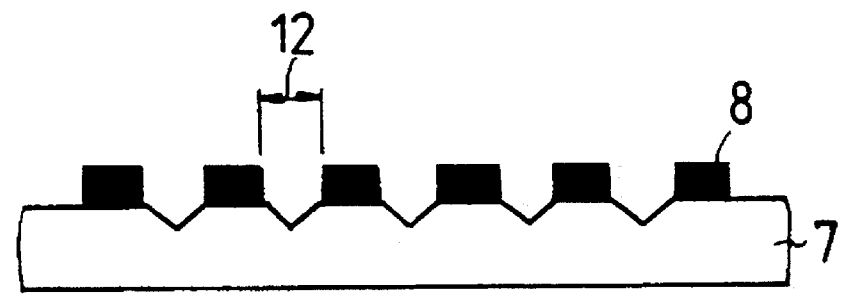
FIG. 3 is a sectional view of the wafer which was subjected to an etching treatment using the photoresists of FIG. 2.
Figure 4:
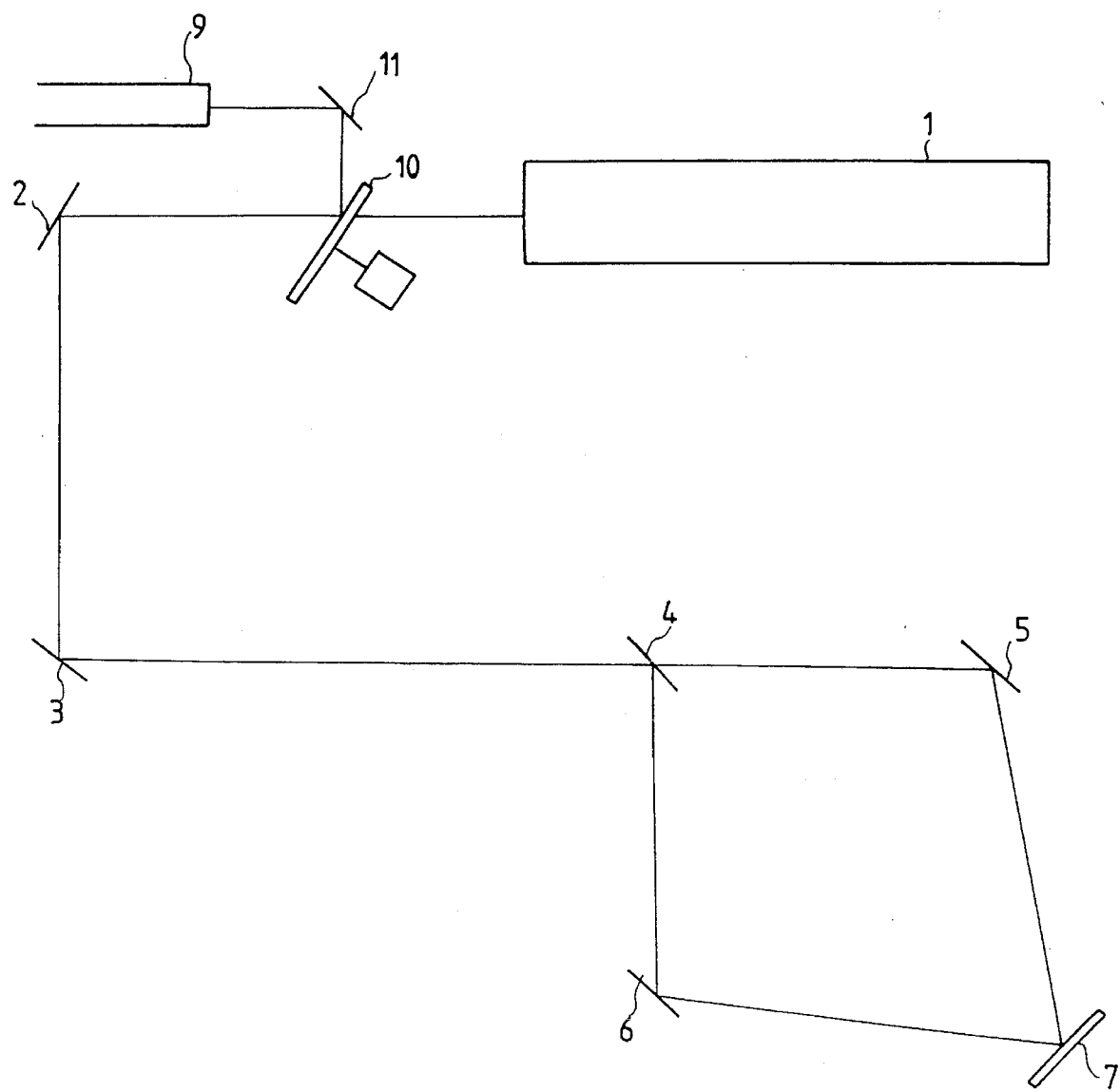
FIG. 4 a schematic view showing a construction of a holographic interference exposing device in accordance with an embodiment of the present invention.

With reference to FIG. 4, there is shown a holographic interference exposing device in accordance with an embodiment of the present invention. As shown in this drawing, the exposing device of the present invention has the same elements as in the prior embodiment of FIG. 1. However, this exposing device further comprises an additional laser source 9, a chopper 10 and an additional mirror 11.

In the exposing device of this invention, the ultraviolet laser source 1 generates an ultraviolet laser beam of a short wavelength while the visible laser source or the He-Ne gas laser source 9 generates a visible laser beam.

Both the laser beams generated by the laser sources 1 and 9 are reflected by mirrors prior to reaching the beam splitter 4. The visible laser beam generated by the He-Ne gas laser source 9 is reflected by the additional mirror 11 to be guided to the chopper 10 which is placed in the light path of the ultraviolet laser beam. In this case, the ultraviolet laser beam generated by the laser source 1 is also guided to the chopper 10 where the two laser beams, that is, the visible laser beam and the ultraviolet laser beam, combine.

The two laser beams are in turn reflected by the first mirror 2 to pass through the same light path.

Thereafter, the two laser beams are guided to the beam splitter 4 where each of them is split into two laser beams which are to pass through different light paths. Thus, there is generated a difference in the light path of the laser beams and such a difference is necessary in forming the desired interference fringe.

The two laser beams, each comprising the ultraviolet laser beam and the visible laser beam, are in turn reflected by individual mirrors 5 and 6 to be redirected on the surface of the semiconductor substrate 7. When the laser beams are focused on the surface of the substrate 7, the desired interference fringe is formed on the surface of the substrate 7.

This interference fringe is used in developing the photoresists on the substrate 7 for forming a supermicro pattern on the substrate 7 as described for the prior art.

In the present invention, the visible laser beam generated by the He-Ne gas laser source 9 has a wavelength of about 6,328 Å, so that it will have no effect upon the semiconductor substrate 7 which is to be exposed to the light having ultraviolet wavelengths.

As described above, the holographic interference exposing device of the present invention uses a visible laser source and a chopper to allow the user to confirm the light path of the laser beam with the naked eye in alignment of the optical system using an invisible laser source. Thus, this exposing device achieves the alignment of the optical system in a short time with no addition of expensive special laser source.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A holographic interference exposing device comprising a main laser source generating a short wavelength laser beam, a beam splitter for splitting said laser beam into two laser beams to cause a difference in the light path of said laser beam and to form a pattern in a semiconductor substrate having photosensitive materials on a surface thereof, means for guiding said laser beam to said beam splitter, and means for redirecting said two laser beams on said surface of said semiconductor substrate, wherein the improvement comprises:

an auxiliary laser source generating a long wavelength laser beam; and a chopper making the light path of said long wavelength laser beam combine with that of said short wavelength laser beam so that a predetermined degree of alignment of said semiconductor substrate with respect to said short wavelength laser beam can be achieved, said long wavelength laser beam being of a sufficiently long wavelength so that it has substantially no effect upon said photosensitive materials.

2. The holographic interference exposing device according to claim 1, wherein said auxiliary laser source generates a visible laser beam.

3. The holographic interference exposing device according to claim 2, wherein said light path of said long wavelength laser beam combines with said short wavelength laser beam before being redirected by said means for redirecting.

4. The holographic interference exposing device according to claim 1, wherein said light path of said long wavelength laser beam combines with said short wavelength laser beam before being redirected by said means for redirecting.

* * * * *